May 3, 1927.
C. S. WILLIAMS
TESTING MACHINE
Filed March 31, 1925
1,627,366
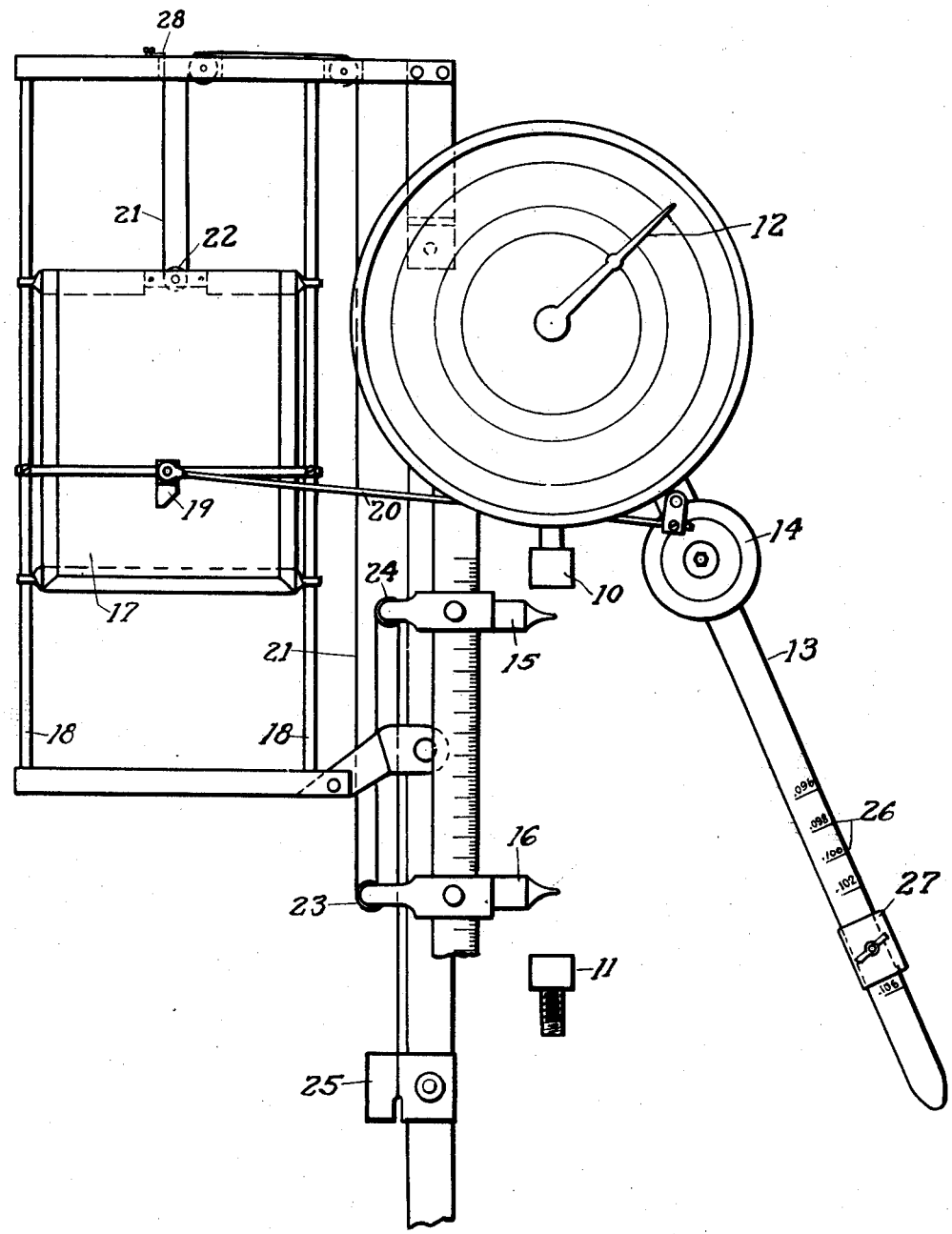
INVENTOR
Carl S. Williams
BY
J. S. Woosty
ATTORNEY Patented May 3, 1927.

1,627,366

UNITED STATES PATENT OFFICE.

CARL S. WILLIAMS, OF WOODBRIDGE, NEW JERSEY, ASSIGNOR TO THE ROESSLER & HASSLACHER CHEMICAL COMPANY, OF NEW YORK, N. Y., A CORPORATION OF NEW YORK.

TESTING MACHINE.

Application filed March 31, 1925. Serial No. 19,585.

This invention relates to testing machines especially tension machines adapted for materials having considerable deformation such for example as rubber, and has for its object to provide a machine with stress-strain recorder whereby the previously required calculations may be dispensed with. Another object is to provide means for compensating for variations in thickness or gauge whereby accurate results are obtainable without additional computations or corrections. While this invention is adapted for use with different materials its use with samples of a material like rubber which has considerable elongation is described.

Elongation under different stresses is important in the examination of samples of different kinds of rubber. At present test sheets of rubber specimens about one-tenth of an inch thick are made up and from these sheets strips of about one-eighth of an inch are cut preferably by stamping for use in a tension testing machine where simultaneous readings of stress and elongation are taken. From an accurate knowledge of the cross sectional area, the elongations, and the stresses, points for stress-strain curve are computed. This is tedious and consumes much time for the computations as well as the required attention of at least two operators.

Previous endeavors to do away with the computations by having the stress-strain curve plotted directly and automatically by the machine have not produced satisfactory results.

One suggestion was to make the strain record responsive to movement of the lower clamping jaw member to which power is applied. This was not satisfactory because in many machines the upper jaw member also moves and a specially prepared chart is necessary. A worse objection is that unit elongation which is recorded cannot be accurately measured or known since there must be a certain amount of elongation of the material where it passes between the clamping jaws and the separation of the pairs of jaw members before the application of stress is not an accurate measure of the length of material elongated. A further objection resides in the inability to completely dispense with computations since corrections are especially necessary owing to the sheets of sample rubber not being of uniform thickness. Owing to a variety of causes the process by which the sample sheets are made produces samples having a difference of thickness of several thousandths of an inch above or below normal.

According to this invention an accurate stress-strain recorder is provided in which the strain recorded is responsive to separation between a pair of independently movable pointers which may be moved with separation of chalk marks or other indications accurately spaced upon the sample before insertion in the machine. Provision is also made for adjustment of the stress mechanism to compensate for slight variations in thickness of the material whereby the necessity of any computations is dispensed with and stress-strain curves obtainable as though each sample were a standard gauge or thickness.

Referring to the drawing the numeral 10 indicates the upper clamping jaw member of a customary testing machine in which the lower jaw member 11 may be power driven in the usual manner. An ordinary stress indicator 12 measures the force being applied to the sample and depends on movement of the lever 13 on which is located the usual weight 14. The customary pointers 15 and 16 slide upon a graduated bar or may have a tape fixed between them for measuring their separation. The chart holder 17 is slidable up and down between the guides 18 and provided with a stylus 19 fixed against vertical movement but having transverse or lateral movement by means of the connecting bar 20 attached to the lever 13, so that lateral motion of the stylus is proportional to the applied stress. Longitudinal or vertical movement of the chart holder 17 is responsive to the separation of the pointers 15 and 16 through the connecting cord 21 attached at its upper end 28 to the machine frame and also at its lower end 25 clamped to said frame. The path of the connecting cord is as shown in the drawing passing under the pulley 22 on chart holder 17 and under and over pulleys 23 and 24 respectively on pointers 15 and 16 so that motion of the chart holder 17 depends on separation of pointers 15 and 16 and is independent of any motion of pointers 15 and 16 not affecting their separation.

While the foregoing apparatus is sufficient to produce an accurate stress-strain curve with samples of uniform thickness, since as previously said the specimens are not accurate in gauge and to avoid the necessity of corrections having to be made for difference in thickness or gauge, means are also provided to compensate the lever arm 13 so the same curves for samples of the same material but of different thicknesses may result. Instead of the weight 14 a different weight 27 may take the place of the weight 14 and be smaller in size and located farther out on the lever 13 where graduations 26 may be applied to the lever to indicate the location of the weight 27 to give accurate stress-strain curves with slight variations in gauge of the sample. When using the weight 27 in place of the weight 14 and when locating the weight 27 at a point other than its standard position the dial readings 12 will not be accurate although the stress-strain curve will be. The dial reading 12 is only accurate for the location of the weight 27 in its standard position where its effect is the same as that of weight 14. It will be understood that the weight 27 is moved up or down the lever 13 in place of moving the weight 14 in order to obtain larger spacing of the graduations indicating variations in gauge.

In operation the stamped out specimen is first accurately gauged or measured in depth. Since all samples are cut by the same stamp and of uniform width no measurement of this dimension is necessary. If the sample is of standard thickness i. e. say one-tenth of an inch it is placed in the clamping jaws and the machine started after having arranged the pointers 15 and 16 opposite chalk marks accurately spaced such as an inch apart on the sample and after positioning the stylus on the zero point of the ordinates and abscissæ. As the sample stretches the chalk marks separate and the pointers 15 and 16 are each moved to follow along beside its particular chalk mark. No readings need be taken and the only care required is in following the chalk marks with the pointers 15 and 16. Plotting of the stress-strain curve is automatic. In case a specimen is not of standard gauge the weight 27 is adjusted to the graduation corresponding to the particular thickness, the weight 14 being removed. This enables lateral movements of the stylus to be the same as if the sample were of standard gauge although as stated movements of the indicator 12 will not be accurate except when the weight 14 or 27 is in its standard positions.

Among the advantages of this invention may be mentioned the reduction in labor by doing away with at least one attendant in obtaining the desired stress-strain curves. Another advantage is increased speed and facility of operation by doing away with the necessity for any computations or corrections. A big advantage of this invention resides in the accuracy of results obtainable because movement of the chart holder or strain relation plotted is proportional to the separation between pointers 15 and 16 so that accuracy in measuring elongation of the chalk marks results. Since both chalk marks on the specimen move during elongation the only accurate record of strain will be one which depends not upon any movements of the pointers 15 and 16 but only upon relative movements between the pointers affecting their separation. Another advantage of this invention resides in the facility with which samples of slightly larger or smaller than standard gauge may be handled without the necessity of making corrections. If the compensating means for variations in gauge were not provided for, samples of the same material but of different gauge would produce curves in different portions of the chart and would therefore be inaccurate and would have to be corrected, but by the simple expedient of moving the weight 27 to the graduation corresponding to the particular gauge no such correction is necessary. While this machine is adapted for testing a wide variety of materials and sizes it is especially useful in the handling of samples of materials like rubber which have a considerable elongation. By accurately positioning the stylus before the machine is started it is not necessary to take any readings of the indicator 12. In the embodiment illustrated the stress graduations on the chart are not uniform but vary with the sine of the angle through which the lever arm 13 moves. The cord 21 is preferably of a substantial material such as fishing line which is not affected by moisture and strain as otherwise it would be necessary to calibrate the strain recording means more frequently.

By gauge is meant size generally as well as thickness. The term stress indicating means must not be limited to the indicator 12 alone because from the above it will be seen the indicator 12 is often inaccurate when corrections are made for thickness. The recording means does not include only the stylus but the movable mounting for the chart holder 17 as well since it will be understood that movement of the chart by connecting means 20 and actuating of pen by cord 21 is within the scope of the invention.

What I claim is:

1. A testing machine comprising relatively movable holding members for the material to be tested, means for varying the separation of said holding members and applying stress to the material, a recorder, means for actuating said recorder in response to the stress on said material, means for measuring the strain on a portion of the material comprising manually operable pair of means for following the divergence of marks on said material being tested, said manually operable means being mechanically independent of the holding members and of the material being tested, and means for actuating said recorder in response to the measured strain.

2. A testing machine comprising relatively movable pairs of clamping jaw members in which the material to be tested is adapted to be held, means for separating said jaw members to elongate the material by applying a stress thereto, a recorder, means for actuating the recorder in response to the stress on the material, means for measuring the elongation of a portion of said material comprising a pair of manually operable pointers for following the divergence of marks on said material being tested, said pointers being mechanically independent of the jaw members and of the material being tested, and means connecting said recorder with said pointer for actuating the recorder in response to the separation of the pointers.

3. A testing machine comprising relatively movable pairs of clamping jaw members in which the material to be tested is adapted to be held, means for separating said jaw members to elongate the material by applying a stress thereto, a recorder, means for actuating the recorder in response to the stress on the material, means for measuring the elongation of a portion of said material comprising a pair of manually operable pointers for following the divergence of marks on said material being tested, said pointers being mechanically independent of the jaw members and of the material being tested, and means connecting said recorder with said pointer for actuating the recorder and responsive to the separation of the pointers but unresponsive to any simultaneous equal motion of the pointers in the same direction.

4. A testing machine, means for recording the stress-strain relationship of samples of material having a particular length and area of cross section, and movable weight means on a graduated lever arm for compensating the first means for variations in cross sectional area of the samples.

5. A testing machine comprising relatively movable jaw members between which the material to be tested is held, mechanism for moving said holding means and applying a stress to the material held thereby, a recorder, means for actuating the recorder in response to stress on said material, independently movable means for measuring the strain in said material, means connecting said strain measuring means and the recorder, and adjustable means in said stress-responsive recorder-actuating means for compensating for variations in gauge of the material so as to obtain comparable stress-strain graphs irrespective of the gauge of the material.

6. A testing machine comprising relatively movable pairs of clamping jaw members in which the material to be tested is adapted to be held, means for separating said pairs of jaw members to elongate the material, means for indicating the stress on the material, a recorder, means connecting the recorder with the indicating means, means for measuring the elongation of a predetermined and particular portion of said material between said pairs of jaw members, means connecting said recorder with said last mentioned means, and means for adjusting the stress indicating means to obtain uniform readings of the recorder with samples of the same material having different areas of cross section.

7. A testing machine, comprising pairs of jaw members to hold the material under test, a graduated weighted lever to which one pair of jaw members is connected, a stress-strain recorder, actuating mechanism therefor and means for adjusting the weight to graduations on said lever to compensate for variations in gauge of the material.

8. A testing machine, comprising pairs of jaw members to hold the material under test, a weighted lever to which one pair of jaw members is connected, a stress-strain recorder, means connecting said weighted lever with said recorder, a pair of pointers for measuring the elongation of a particular portion of the material, means connecting said pointers and recorder which is responsive to separation of the pointers without being affected by motion of the pointers not affecting their separation.

9. A testing machine, comprising pairs of jaw members to hold the material under test, a weighted lever to which one pair of jaw members is connected, a stress-strain recorder, means connecting said weighted lever with said recorder, a pair of pointers for measuring the elongation of a particular portion of the material, means connecting said pointers and recorder which is responsive to separation of the pointers without being affected by motion of the pointers not affecting their separation and means for adjusting said weighted lever to compensate for variations in cross section of the material.

10. A testing machine comprising pairs of jaw members to hold the material under test, a strain indicator to which one of the pairs of jaws are attached, a slidably mounted chart holder, a stylus therefor, pointers movable independently of the said jaw members and said material being tested while the machine is in operation for following marks on the specimen under test, means connecting said pointers with the chart holder and responsive only to movement of the pointers affecting their separation, and means connecting said stylus and indicator whereby movement of the pointers with said marks produces a stress-strain curve for the material between said marks.

11. In a testing machine comprising a relatively movable pair of clamping jaw members in which the material to be tested is to be held, means for separating said pairs of jaw members to elongate the material, a pair of movable pointers operatively independent of said jaw members and of the material being tested, a recording device comprising a chart and marker, connection between said pointers and a part of said recording device said connection consisting of a flexible means fastened to the recording device and to a relatively stationary part of the machine and passing by successive turns over pulleys fastened to said pointers, the looping of said flexible means enabling the pointers being moved simultaneously in the same direction with no movement in the recording device, but so arranged that any movement of the pointers relatively to each other is recorded by a corresponding movement of a recording device part.

12. In a testing machine provided with movable pairs of clamping jaws in which the material to be tested is held, actuating mechanism therefor, a recording device comprising a chart and marker, a lever arm for measuring the applied stress fastened to one of said jaw members, a weight on the lever arm, graph position adjusting means comprising gauge graduations on the lever arm for locating said weight and connection from said lever arm to said recording device.

13. In an apparatus as described in claim 12, a pair of movable pointers operatively independent of said jaw members and of the material being tested, connection between said pointers and a part of said recording device, said connection consisting of a flexible means fastened to the recording device and passing by successive turns over pulleys fastened to said pointer carriers, the looping of said flexible means enabling the pointers being moved simultaneously with no movement in the recording device but so arranged that any movement of the pointers relative to each other is recorded by a corresponding movement of a recording device part.

14. A testing machine comprising relatively movable holding members for the material to be tested, means for varying the separation of said holding members and applying stress to the material, a recorder, means for actuating said recorder in response to stress on said material, a pair of independently movable pointers for measuring the elongation of a portion of said material, means connecting the recorder with said pointers and responsive to separation of the pointers but independent of any motion of the pointers in the same direction, and means for adjusting the stress responsive means to obtain uniform stress-strain readings of the recorder with samples of the same material having different areas of cross section.

Signed at New York, in the county of New York and State of New York, this 28th day of March, A. D. 1925.

CARL S. WILLIAMS.